(12) United States Patent
Lee

(10) Patent No.: US 12,719,109 B2
(45) Date of Patent: Aug. 25, 2026

(54) POUCH TYPE BATTERY LIQUID IMMERSION COOLING SYSTEM

(71) Applicant: HYUNDAI MOBIS CO., LTD., Seoul (KR)

(72) Inventor: Yoo Jeong Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 588 days.

(21) Appl. No.: 18/203,271

(22) Filed: May 30, 2023

(65) Prior Publication Data

US 2024/0396119 A1 Nov. 28, 2024

(51) Int. Cl.
*H01M 10/6567* (2014.01)
*H01M 10/613* (2014.01)
*H01M 10/647* (2014.01)
*H01M 10/6554* (2014.01)
*H01M 10/6568* (2014.01)

(52) U.S. Cl.
CPC ..... *H01M 10/6567* (2015.04); *H01M 10/613* (2015.04); *H01M 10/647* (2015.04); *H01M 10/6554* (2015.04); *H01M 10/6568* (2015.04)

(58) Field of Classification Search
None
See application file for complete search history.

(56) References Cited

U.S. PATENT DOCUMENTS

2005/0199019 A1* 9/2005 Marcelle ................. E05B 67/00 340/541
2017/0025646 A1* 1/2017 Ota ..................... H01M 50/103
2018/0248237 A1* 8/2018 Postler .................... B60L 58/26
2024/0170754 A1* 5/2024 Lamm ................ H01M 50/249

FOREIGN PATENT DOCUMENTS

DE 102021105861 A1 * 9/2022 .......... H01M 50/609
JP 2013131428 A * 7/2013
KR 10-2022-0118823 A 8/2022

OTHER PUBLICATIONS

Machine translation of JP2013-131428A, published on Jul. 4, 2013 (Year: 2013).*

* cited by examiner

*Primary Examiner* — Anca Eoff
(74) *Attorney, Agent, or Firm* — Morgan, Lewis & Bockius LLP

(57) ABSTRACT

Provided is a battery pack cooling system. A pouch type battery liquid immersion cooling system of the present disclosure having the above configuration may have a lighter weight and higher cooling performance than a conventional liquid immersion cooling system by using an absorbent material including a cooling fluid inside, may be continuously cooled with a limited amount of the fluid by evaporating and condensing the cooling fluid included in the absorbent material, and may achieve the higher cooling performance by using latent heat of the evaporation.

14 Claims, 8 Drawing Sheets

[FIG. 1]
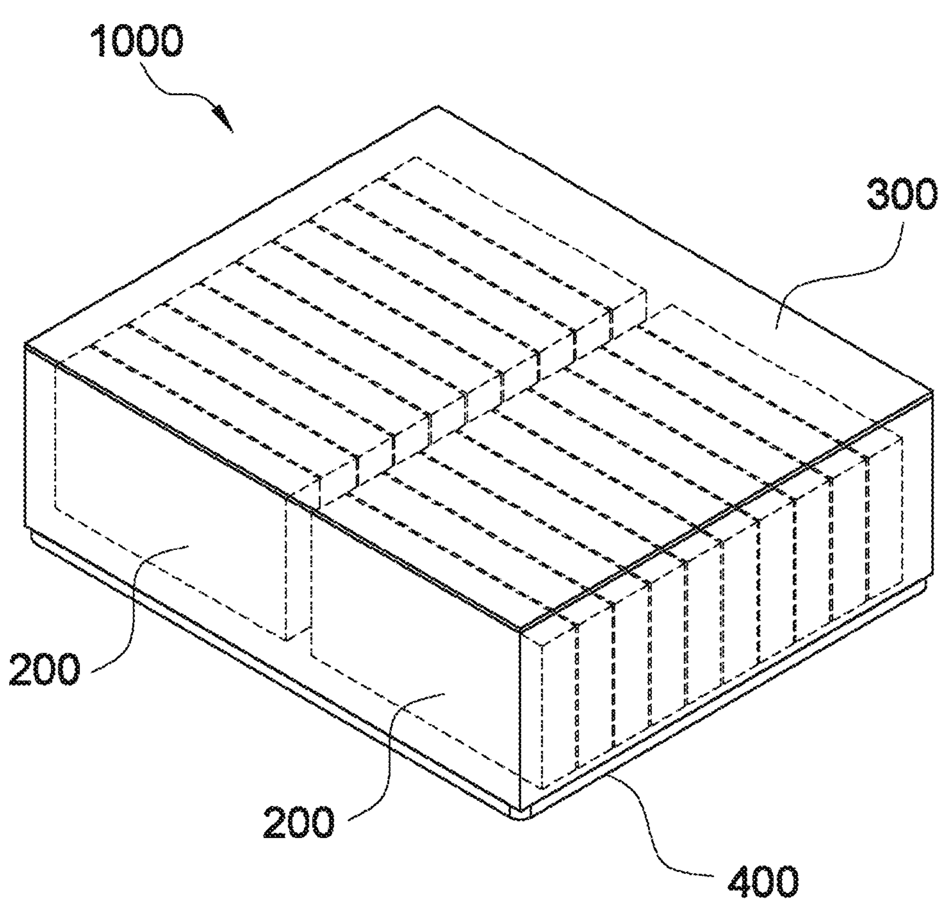

[FIG. 2]
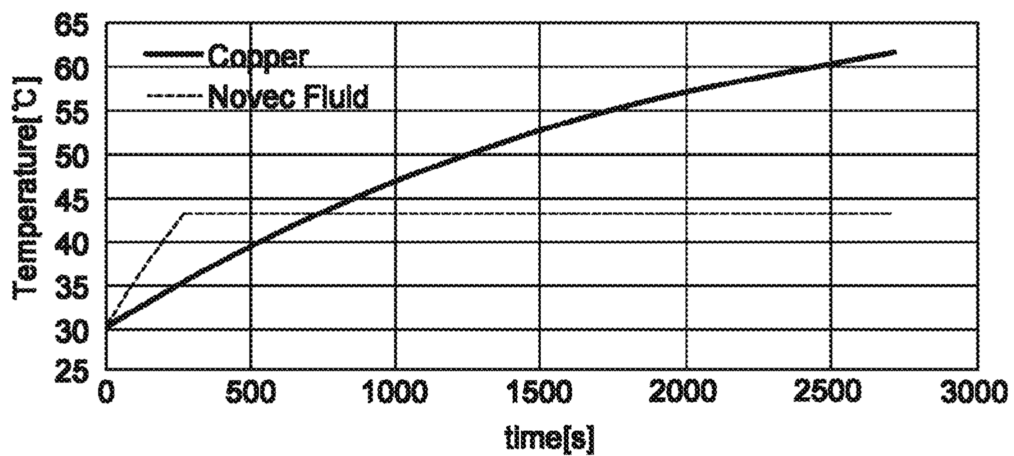

[FIG. 3]
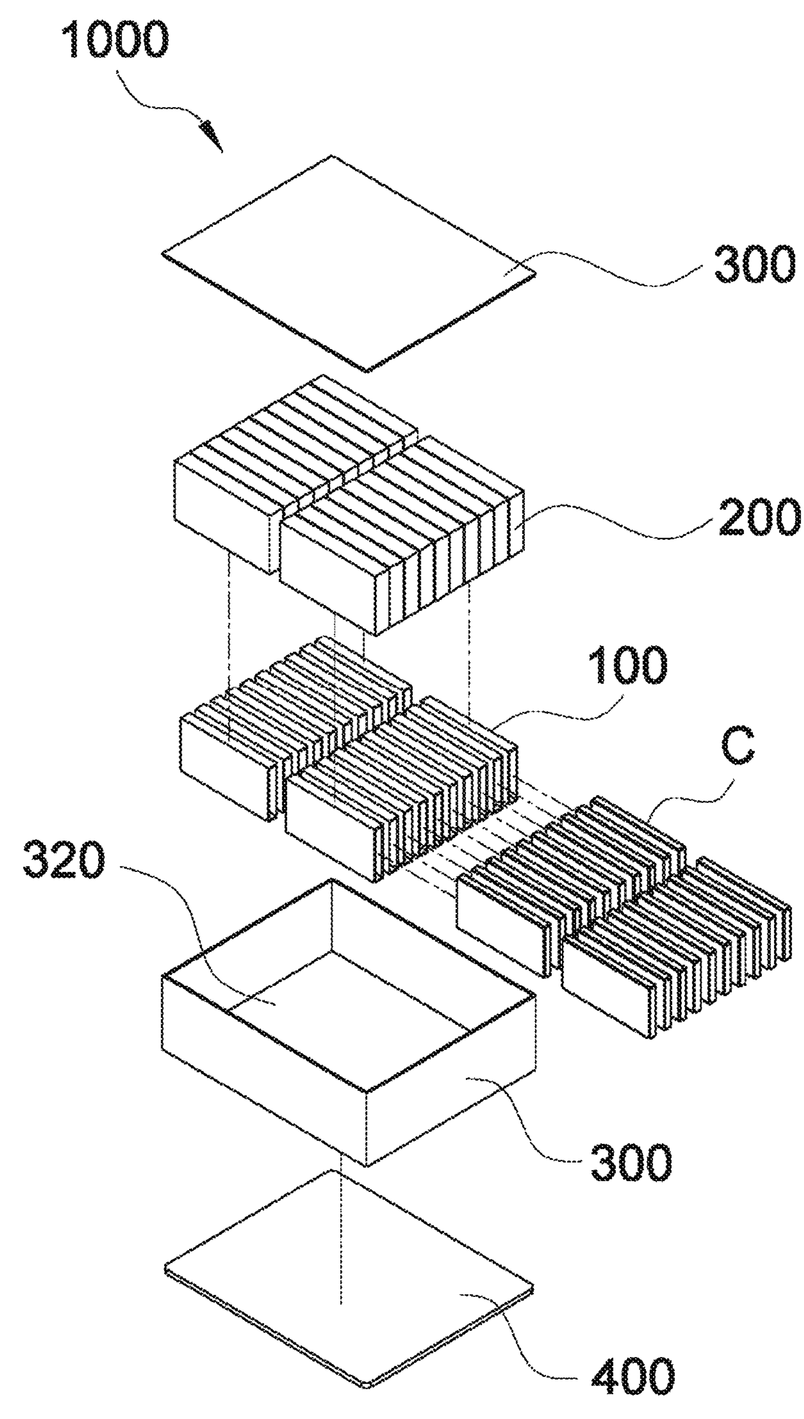

[FIG. 4]
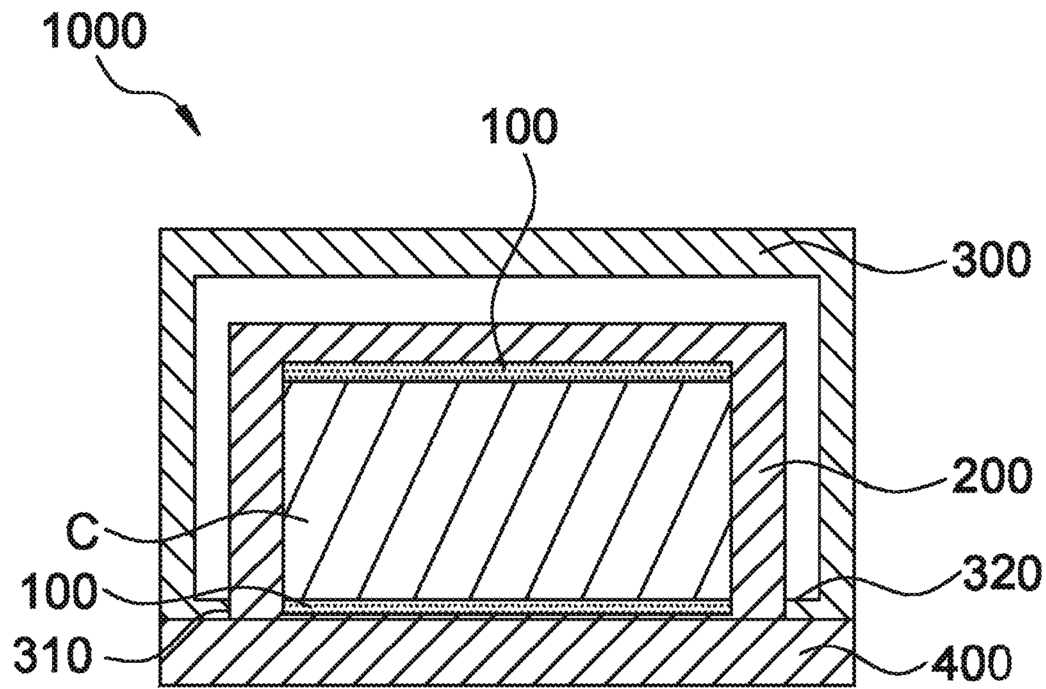

[FIG. 5]
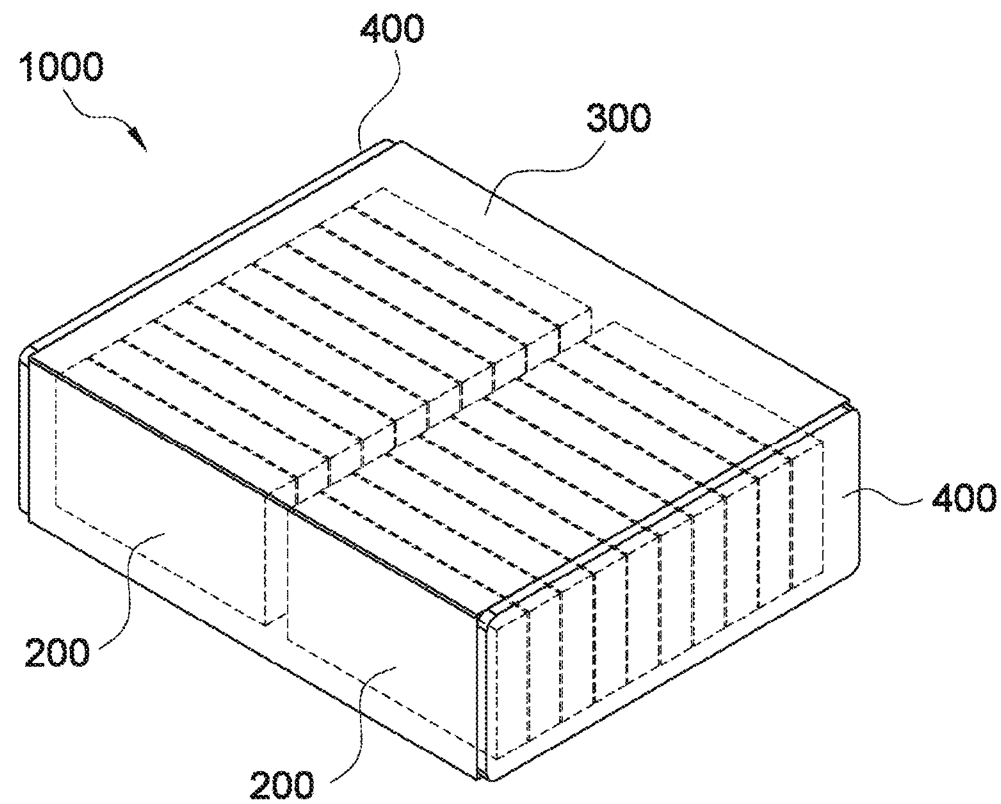

[FIG. 6]
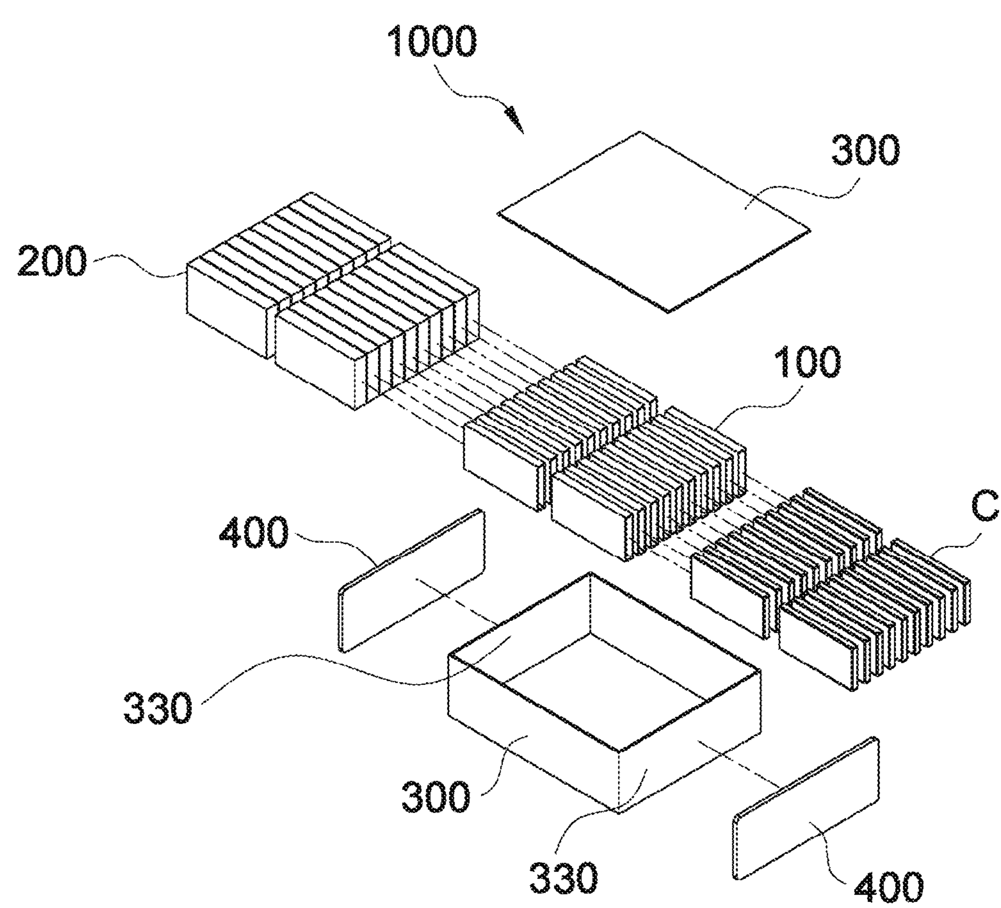

[FIG. 7]
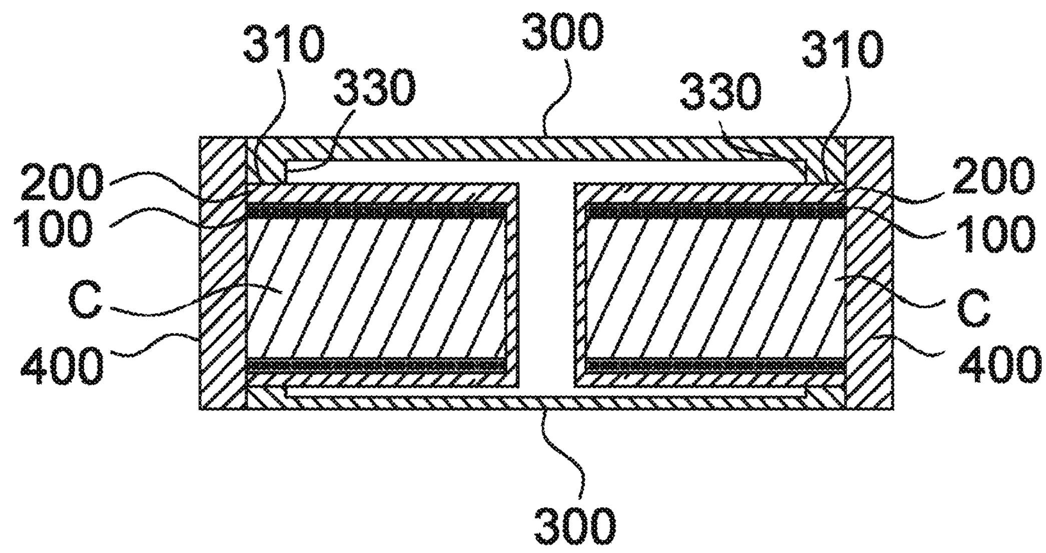

[FIG. 8]
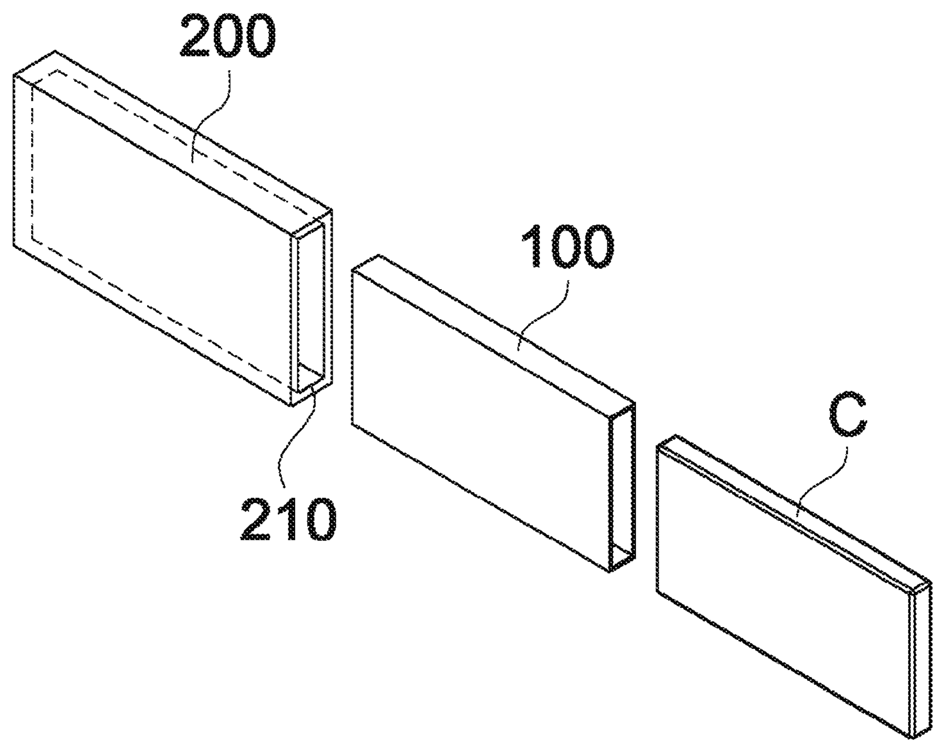

POUCH TYPE BATTERY LIQUID IMMERSION COOLING SYSTEM

CROSS-REFERENCE OF RELATED APPLICATIONS

This application claims priority under 35 U.S.C. § 119 to Korean Patent Application No. 10-2023-0066754, filed on May 24, 2023, in the Korean Intellectual Property Office, the disclosure of which is incorporated herein by reference in its entirety.

TECHNICAL FIELD

The following disclosure relates to a battery pack cooling system.

BACKGROUND

Air mobility requires high power that is 2 to 3 times greater than that of existing electric vehicles, and simultaneously requires a light weight as an important design factor. However, a heat value of a battery may be increased as output of the battery is increased. A water-cooling method or an air-cooling method, which is used in most electric vehicles currently in mass production, requires replacing the battery and a cooling fluid line together when replacing the battery. Therefore, this method is not suitable for replaceable batteries, and has limitations in temperature management of high-performance batteries.

Accordingly, a conventional technology adopts a liquid immersion cooling method, which has an advantage in cooling performance. However, in the liquid immersion cooling, an amount of a cooling fluid may be considerable because an entire mobility battery is filled with the fluid, and a weight of the battery may be greatly increased because the density of an insulating fluid mainly used for the liquid immersion cooling is typically twice that of water. In addition, even when only a portion of the battery is filled with the cooling fluid, movement of the cooling fluid is restricted, and it is thus difficult to uniformly cool all battery cells in the mobility battery having various movements.

RELATED ART DOCUMENT

Patent Document (Patent Document 1) Korean Patent Laid-Open Publication No. 10-2022-0118823, entitled "VEHICLE BATTERY COOLING SYSTEM IN FAST CHARGING SYSTEM"

SUMMARY

An embodiment of the present disclosure is directed to providing a pouch type battery liquid immersion cooling system that uses an absorbent material including a cooling fluid inside to have a lighter weight and higher cooling performance than a conventional liquid immersion cooling system.

Another embodiment of the present disclosure is directed to providing a pouch type battery liquid immersion cooling system which may be continuously cooled with a limited amount of the fluid by evaporating and condensing the cooling fluid included in the absorbent material, and may achieve the higher cooling performance by using latent heat of the evaporation.

In one general aspect, a pouch type battery liquid immersion cooling system includes: a cooling unit cooling a battery cell by being in contact with a surface of the battery cell; and a fixed cartridge attaching the cooling unit to the battery cell by embedding the cooling unit and the battery cell inside, wherein the cooling unit includes a porous absorbent member, and includes a cooling fluid flowing the inside and outside thereof and cooling the battery cell.

The system may further include: a case embedding the plurality of battery cells, the cooling unit, and the fixed cartridge inside; and a cooling plate attached to an outer surface of the case and exchanging heat with the cooling fluid.

The cooling plate may be attached to the outside of a bottom surface of the case, and the case may include a heat exchange hole disposed in at least a portion of a region where the bottom surface of the case and the cooling plate are in contact with each other.

The case may include the heat exchange hole disposed in the region where the bottom surface of the case, the cooling plate, and a lower surface of the fixed cartridge are in contact with one another.

The cooling plate may be attached to a side surface of the case, that is, each of the two side surfaces of the case that is perpendicular to one direction of the battery cell, and the case may include a heat exchange hole disposed in at least a portion of a region where the side surface of the case and the cooling plate are in contact with each other.

The case may include the heat exchange hole disposed in the region where the side surface of the case, the cooling plate, and one surface of the fixed cartridge may be in contact with one another.

The fixed cartridge may include an insertion hole disposed in one surface thereof for the cooling unit and the battery cell to be detached from the fixed cartridge.

The fixed cartridge may include two or more insertion holes disposed in a stacking direction of the battery cells.

The cooling unit may have a shape of a closed strip in which the cooling unit is in contact with all the surfaces of the battery cell except for its surface parallel to the stacking direction of the battery cells.

The cooling unit may include at least one of glass fiber, polypropylene, and amorphous silica fiber.

BRIEF DESCRIPTION OF THE DRAWINGS

FIG. 1 is an overall perspective view of a pouch type battery liquid immersion cooling system of the present disclosure.

FIG. 2 is a graph showing a battery temperature change when using the pouch type battery liquid immersion cooling system of the present disclosure.

FIG. 3 is an exploded perspective view of a first embodiment of the pouch type battery liquid immersion cooling system of the present disclosure.

FIG. 4 is a cross-sectional view of a first embodiment of the pouch type battery liquid immersion cooling system of the present disclosure.

FIG. 5 is an overall perspective view of a second embodiment of the pouch type battery liquid immersion cooling system of the present disclosure.

FIG. 6 is an exploded perspective view of a second embodiment of the pouch type battery liquid immersion cooling system of the present disclosure.

FIG. 7 is a cross-sectional view of a second embodiment of a pouch type battery liquid immersion cooling system of the present disclosure.

FIG. 8 is an exploded perspective view showing the fixed cartridge and cooling unit of the present disclosure.

DETAILED DESCRIPTION OF EMBODIMENTS

Hereinafter, the spirit of the present disclosure is described in more detail with reference to the accompanying drawings. Terms and words used in the specification and claims are not to be construed as general or dictionary meanings, and are to be construed as meanings and concepts meeting the spirit of the present disclosure based on a principle so that the inventors may appropriately define the concepts of terms in order to describe their inventions in the best mode.

Hereinafter, the description describes a basic configuration of a pouch type battery liquid immersion cooling system 1000 of the present disclosure with reference to FIGS. 1 and 2.

As shown in FIG. 1, the pouch type battery liquid immersion cooling system 1000 of the present disclosure may cool a pouch type battery cell C (shown in FIGS. 3 and 4) by being in contact with a surface of the battery cell C, and in more detail, by including a cooling unit 100 cooling the battery cell C by being in direct contact with the battery cell C. The cooling unit 100 may include a porous absorbent member, and include a cooling fluid flowing inside and outside thereof and cooling the battery cell. The cooling unit 100 may also have electrical insulation and thermal conductivity. Accordingly, the cooling unit 100 may include at least one of glass fiber, polypropylene, and amorphous silica fiber. The system 1000 may have a lighter weight and simultaneously have higher cooling performance than a conventional liquid immersion cooling system by using the porous absorbent member in the cooling unit 100.

In addition, the cooling fluid included in the cooling unit 100 may be an insulating fluid or may be a non-reactive fluid. The cooling fluid may be, for example, hydrofluoroether (HFE). The cooling fluid may absorb heat occurring from the battery cell C and cool the battery cell C through conduction, convection, and evaporation. To this end, the cooling fluid may need to be easily vaporized, and preferably have a low boiling point (of 50 to 60° C. or less).

In addition, the pouch type battery liquid immersion cooling system 1000 of the present disclosure may include a fixed cartridge 200. The fixed cartridge 200 may have an inner space, and support positions of the cooling unit 100 and the battery cell C by embedding the cooling unit 100 and the battery cell C in the inner space. Accordingly, the cooling unit 100 may be attached to a surface of the battery cell C to cool the battery cell C.

In addition, the pouch type battery liquid immersion cooling system 1000 of the present disclosure may further include a case 300 and a cooling plate 400. The case 300 may embed the plurality of fixed cartridges 200 each accommodating the battery cell C and the cooling unit 100 in the inner space, and may protect the battery cell C from an external influence. In addition, the cooling plate 400 may be attached to an outer surface of the case 300, may cool the battery cell C, and condense the cooling fluid. Accordingly, even when the cooling fluid included in the cooling unit 100 changes its phase by absorbing heat occurring in the battery cell C, the cooling fluid may be re-cooled by the cooling plate 400 and condensed in the cooling unit 100 again. Accordingly, the pouch type battery liquid immersion cooling system 1000 of the present disclosure may continuously evaporate and condense the cooling fluid inside the case 300, perform the continuous cooling with a limited amount of the fluid, and achieve the higher cooling performance for the battery cell C by using latent heat of the evaporation.

Hereinafter, in order to more substantially describe the above effect of the pouch type battery liquid immersion cooling system 1000 of the present disclosure, performed is a comparison of cooling performance of the cooling fluid of the pouch type battery liquid immersion cooling system 1000 of the present disclosure with that of a copper metal mainly used as a conventional heat conduction material. Here, the comparison is performed under the following assumption. Performed is the comparison of a case where a 3 mm thick copper metal or Novec 72DE which is the insulating fluid is in contact with the surface of the battery cell C. Here, it is assumed that heat with $Q_{in}=Q_{out}+\Delta U$ or $Q_{in}=Q_{out}+\Delta U$ may occur from the cell, a constant temperature of 25° C. is maintained outside, and the cooling is performed with a convective heat transfer coefficient h=300 $W/m^2 \cdot K$. As a result of analyzing a battery temperature change over time under the above assumption, in the case of the conventional copper metal, the battery temperature is continuously increased to reach 56° C. after 30 minutes, whereas the insulating fluid used as the cooling fluid of the present disclosure evaporates at a boiling point of 43° C. or more and maintains a constant boiling point temperature. It may be seen that the NOVEC fluid has latent heat of the evaporation of $h_{fg}=217.6$ J/g, and dissipates 60 W of heat with the fluid evaporation of about m=0.276 g/s. This configuration is shown in FIG. 2.

In the above environment, the pouch type battery liquid immersion cooling system 1000 of the present disclosure may secure the heat dissipation of 60 W by the fluid evaporation of m=0.276 g/s. Here, required is 82.8 g of the cooling fluid for each cell. For the same performance, in the conventional case, the copper metal having a thickness of 3t corresponding to a mass of the battery cell C is required to be in contact with a side surface of the cell, and 124 g is a mass of the copper metal required here. That is, it may be seen that the cooling unit 100 of the pouch type battery liquid immersion cooling system 1000 of the present disclosure has a weight much lighter than the conventional system (about 4 kg difference per 100 battery cells C).

In addition, in the pouch type battery liquid immersion cooling system 1000 of the present disclosure, heat occurring while the cooling fluid is evaporated may be condensed again by the cooling plate 400 and the cooling fluid may thus be absorbed into the cooling unit 100. Accordingly, the system 1000 may not need to continuously supply the cooling fluid, thus reducing a required amount of the cooling fluid. Therefore, the cooling fluid may provide a higher gravimetric energy density to the cooling system.

Hereinafter, the description describes a first embodiment of the pouch type battery liquid immersion cooling system 1000 of the present disclosure with reference to FIGS. 3 and 4.

As shown in FIG. 3, in a first embodiment of the pouch type battery liquid immersion cooling system 1000 of the present disclosure, the cooling plate 400 may be attached to the outside of a bottom surface of the case 300. Here, as shown in FIG. 4, in an embodiment of the case 300, a heat exchange hole 310 may preferably be disposed in at least a portion of a region where the bottom surface of the case 300 and the cooling plate 400 are in contact with each other. Accordingly, the cooling plate 400 may more effectively absorb heat from the battery cell C. Alternatively, instead of the heat exchange hole 310, at least a portion of a region where a side surface of the case 300 that is in contact with the cooling plate 400 may be made of a thermally conductive material.

Furthermore, in order to more easily absorb heat from the battery cell C and the cooling unit 100, the heat exchange hole 310 may be disposed in a region where the bottom surface of the case 300 and a lower surface of the fixed cartridge 200 are in contact with each other. Accordingly, the inner space of the fixed cartridge 200 including the battery cell C and the cooling unit 100 may be in direct contact with the cooling plate 400, and the evaporated cooling fluid may be easily condensed by the cooling plate 400.

Hereinafter, the description describes a second embodiment of the pouch type battery liquid immersion cooling system 1000 of the present disclosure with reference to FIGS. 5 to 7.

As shown in FIGS. 5 and 6, in a second embodiment of the pouch type battery liquid immersion cooling system 1000 of the present disclosure, the cooling plate 400 may be attached to the side surface of the case 300, that is, the outside of each of two side surfaces of the case 300 that is perpendicular to one direction of the battery cell C. Here, the fixed cartridge 200 may be in contact with the inside of the side surface of the case 300 that the cooling plate 400 is in contact with. In addition, as shown in FIG. 7, in an embodiment of the case 300, a heat exchange hole 310 may be disposed in at least a portion of a region where the side surface of the case 300 and the cooling plate 400 are in contact with each other. Accordingly, the cooling plate 400 may more effectively absorb heat from the battery cell C. Alternatively, instead of the heat exchange hole 310, at least a portion of a region where a side surface of the case 300 that is in contact with the cooling plate 400 may be made of a thermally conductive material.

Furthermore, in order to more easily absorb heat from the battery cell C and the cooling unit 100, the heat exchange hole 310 may be disposed in a region where the side surface of the case 300 and any one surface of the fixed cartridge 200 are in contact with each other. Accordingly, the inner space of the fixed cartridge 200 including the battery cell C and the cooling unit 100 may be in direct contact with the cooling plate 400, and the evaporated cooling fluid may be easily condensed by the cooling plate 400.

Hereinafter, the description describes the shapes and embodiments of the fixed cartridge 200 and cooling unit 100 of the present disclosure in more detail with reference to FIG. 8.

As shown in FIG. 8, the fixed cartridge 200 of the pouch type battery liquid immersion cooling system 1000 of the present disclosure may include an insertion hole 210 disposed in one surface thereof for the cooling unit 100 and the battery cell C to be detached from the fixed cartridge 200. Here, one surface of the fixed cartridge 200, in which the insertion hole 210 is disposed, may be a surface where the fixed cartridge 200, the case 300, and the cooling plate 400 are in contact with one another. That is, in a first embodiment of the above-mentioned pouch type battery liquid immersion cooling system 1000, the insertion hole 210 may be disposed in a lower surface of the fixed cartridge 200, and in a second embodiment of the pouch type battery liquid immersion cooling system 1000, the insertion hole 210 may be disposed in a side surface of the fixed cartridge 200. The example shown in FIG. 8 is an embodiment where the insertion hole 210 is disposed in the side surface of the fixed cartridge 200.

In addition, the fixed cartridge 200 may attach the cooling unit 100 to the battery cell C by being in at least partial contact with the cooling unit 100, and simultaneously include the inner space having a larger volume than the cooling unit 100 and the battery cell C to thus secure a space where the cooling fluid of the cooling unit 100 evaporate.

In addition, in an embodiment of the fixed cartridge 200, the fixed cartridge 200 may include two or more insertion holes 210 disposed in a stacking direction of the battery cells C. Here, a surface of the fixed cartridge 200, on which the insertion hole 210 is disposed, may be perpendicular to a surface of the fixed cartridge 200, on which the respective battery cells C are stacked. Accordingly, the plurality of battery cells C and the plurality of cooling units 100 may be accommodated in one fixed cartridge 200.

In addition, the cooling unit 100 may have a shape of a closed strip in which the cooling unit 100 is in contact with all the surfaces of the battery cell C except for its surface parallel to the stacking direction of the battery cells C, that is, each of two surfaces of the battery cell C that has the smallest area. Accordingly, the battery cell C and the cooling unit 100 may be easily detached, and simultaneously, the cooling unit 100 may be in contact with the most surfaces of the battery cell C to more effectively absorb heat from the battery cell C.

As set forth above, the pouch type battery liquid immersion cooling system of the present disclosure having the above configuration may have the lighter weight and the higher cooling performance than the conventional liquid immersion cooling system by using the absorbent member including the cooling fluid inside.

In addition, the pouch type battery liquid immersion cooling system of the present disclosure may be continuously cooled with the limited amount of the fluid by evaporating and condensing the cooling fluid included in the absorbent material, and may achieve the higher cooling performance by using the latent heat of the evaporation.

The spirit of the present disclosure should not be limited to the embodiments described above. The present disclosure may be applied to various fields and may be variously modified by those skilled in the art without departing from the scope of the present disclosure claimed in the claims. Therefore, it is obvious to those skilled in the art that these alterations and modifications fall within the scope of the present disclosure.

What is claimed is:

1. A pouch type battery liquid immersion cooling system, system comprising:

a cooling unit being in contact with a surface of a battery cell and configured to cool the battery cell;

a fixed cartridge embedding the cooling unit and the battery cell therein to attach the cooling unit to the battery cell;

a case embedding the battery cell, the cooling unit, and the fixed cartridge inside; and a cooling plate attached to an outer surface of the case, wherein the cooling unit includes a porous absorbent member, and includes a cooling fluid flowing the inside and outside thereof and configured to cool the battery cell, the cooling plate is attached to the outside of a bottom surface of the case and is configured to exchange heat with the cooling fluid, and the case includes a heat exchange hole disposed in at least a portion of a region where the bottom surface of the case and the cooling plate are in contact with each other.

2. The system of claim 1, wherein the case includes the heat exchange hole disposed in the region where the bottom surface of the case, the cooling plate, and a lower surface of the fixed cartridge are in contact with one another.

3. The system of claim 1, wherein the fixed cartridge includes an insertion hole disposed in one surface thereof for the cooling unit and the battery cell to be detached from the fixed cartridge.

4. The system of claim 3, wherein a plurality of the battery cells are included, and the fixed cartridge includes two or more insertion holes disposed in a stacking direction of the battery cells.

5. The system of claim 1, wherein the cooling unit includes at least one of glass fiber, polypropylene, and amorphous silica fiber.

6. A pouch type battery liquid immersion cooling system, system comprising:

a cooling unit being in contact with a surface of a battery cell and configured to cool the battery cell;

a fixed cartridge embedding the cooling unit and the battery cell therein to attach the cooling unit to the battery cell;

a case embedding the battery cell, the cooling unit, and the fixed cartridge inside; and a cooling plate attached to a side surface of the case which is one of two side surfaces of the case perpendicular to one direction of the battery cell, wherein the cooling unit includes a porous absorbent member, and includes a cooling fluid flowing the inside and outside thereof and configured to cool the battery cell, the cooling plate is configured to exchange heat with the cooling fluid, and the case includes a heat exchange hole disposed in at least a portion of a region where the side surface of the case and the cooling plate are in contact with each other.

7. The system of claim 6, wherein the case includes the heat exchange hole disposed in the region where the side surface of the case, the cooling plate, and one surface of the fixed cartridge are in contact with one another.

8. The system of claim 6, wherein the fixed cartridge includes an insertion hole disposed in one surface thereof for the cooling unit and the battery cell to be detached from the fixed cartridge.

9. The system of claim 8, wherein a plurality of the battery cells are included, and the fixed cartridge includes two or more insertion holes disposed in a stacking direction of the battery cells.

10. The system of claim 6, wherein the cooling unit includes at least one of glass fiber, polypropylene, and amorphous silica fiber.

11. A pouch type battery liquid immersion cooling system, system comprising:

a cooling unit being in contact with a surface of a battery cell and configured to cool the battery cell; and a fixed cartridge embedding the cooling unit and the battery cell therein to attach the cooling unit to the battery cell, wherein the cooling unit includes a porous absorbent member, and includes a cooling fluid flowing the inside and outside thereof and configured to cool the battery cell, and a plurality of the battery cells are included, and the cooling unit has a shape of a closed strip in which the cooling unit is in contact with all the surfaces of the battery cell except for a surface parallel to a stacking direction of the battery cells.

12. The system of claim 11, wherein the fixed cartridge includes an insertion hole disposed in one surface thereof for the cooling unit and the battery cell to be detached from the fixed cartridge.

13. The system of claim 12, wherein a plurality of the battery cells are included, and the fixed cartridge includes two or more insertion holes disposed in a stacking direction of the battery cells.

14. The system of claim 11, wherein the cooling unit includes at least one of glass fiber, polypropylene, and amorphous silica fiber.

* * * * *